(12) United States Patent
Cho et al.

(10) Patent No.: US 8,463,303 B2
(45) Date of Patent: Jun. 11, 2013

(54) MOBILE COMMUNICATION TERMINAL AND METHOD OF THE SAME FOR OUTPUTTING SHORT MESSAGE

(75) Inventors: Soo-ho Cho, Seoul (KR); Young-ho Rhee, Seoul (KR); Young-kyu Jin, Seoul (KR); Hyun-joo Kang, Seoul (KR); Joo-kyung Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 816 days.

(21) Appl. No.: 11/515,756

(22) Filed: Sep. 6, 2006

(65) Prior Publication Data

US 2007/0054679 A1    Mar. 8, 2007

(30) Foreign Application Priority Data

Sep. 6, 2005    (KR) ........................ 10-2005-0082862

(51) Int. Cl.
*H04W 4/14*    (2009.01)
(52) U.S. Cl.
USPC ..................... 455/466; 455/412.2; 455/414.1; 455/418; 709/206; 709/207; 715/758
(58) Field of Classification Search
USPC .............. 455/466, 412.2, 566, 415, 445, 418, 455/414.1; 709/201–207, 227, 228, 246–247, 709/313, 329, 219, 223, 250
See application file for complete search history.

(56) References Cited

U.S. PATENT DOCUMENTS

| | | | | |
|---|---|---|---|---|
| 5,907,604 | A  * | 5/1999 | Hsu ........................... | 379/142.06 |
| 7,274,949 | B2 * | 9/2007 | Tanaka ....................... | 455/556.1 |
| 2002/0065088 | A1 * | 5/2002 | Seignol et al. ................ | 455/466 |
| 2003/0100295 | A1 * | 5/2003 | Sakai et al. .................. | 455/415 |
| 2004/0215731 | A1 * | 10/2004 | Tzann-en Szeto ............ | 709/207 |
| 2005/0261031 | A1 * | 11/2005 | Seo et al. ..................... | 455/566 |
| 2006/0068814 | A1 * | 3/2006 | Cheng et al. .................. | 455/466 |
| 2006/0084450 | A1 * | 4/2006 | Dam Nielsen et al. ........ | 455/466 |
| 2007/0266099 | A1 * | 11/2007 | Wang et al. ................... | 709/206 |

FOREIGN PATENT DOCUMENTS

| | | | |
|---|---|---|---|
| JP | 2002-176619 | A | 6/2002 |
| KR | 10-2004-0025313 | A | 3/2004 |
| KR | 10-2004-0079698 | A | 9/2004 |
| WO | WO 03/039169 | A1 | 5/2003 |
| WO | 2005/043398 | A1 | 5/2005 |

* cited by examiner

*Primary Examiner* — Vladimir Magloire
*Assistant Examiner* — Babar Sarwar
(74) *Attorney, Agent, or Firm* — Sughrue Mion, PLLC

(57) ABSTRACT

A mobile communication terminal and a method for outputting a short message thereof are provided. The mobile communication terminal according to an exemplary embodiment of the present invention includes a short message interpretation unit which extracts a phone number of a sender from a header of a short message, a short message processing unit which obtains an image mapped to the extracted phone number and generates a screen on which the image is combined with the text of the short message, a mapping unit which maps the image to the phone number of the sender, a storage unit which stores the phone number of the sender and the image and an output unit which outputs the screen.

26 Claims, 10 Drawing Sheets

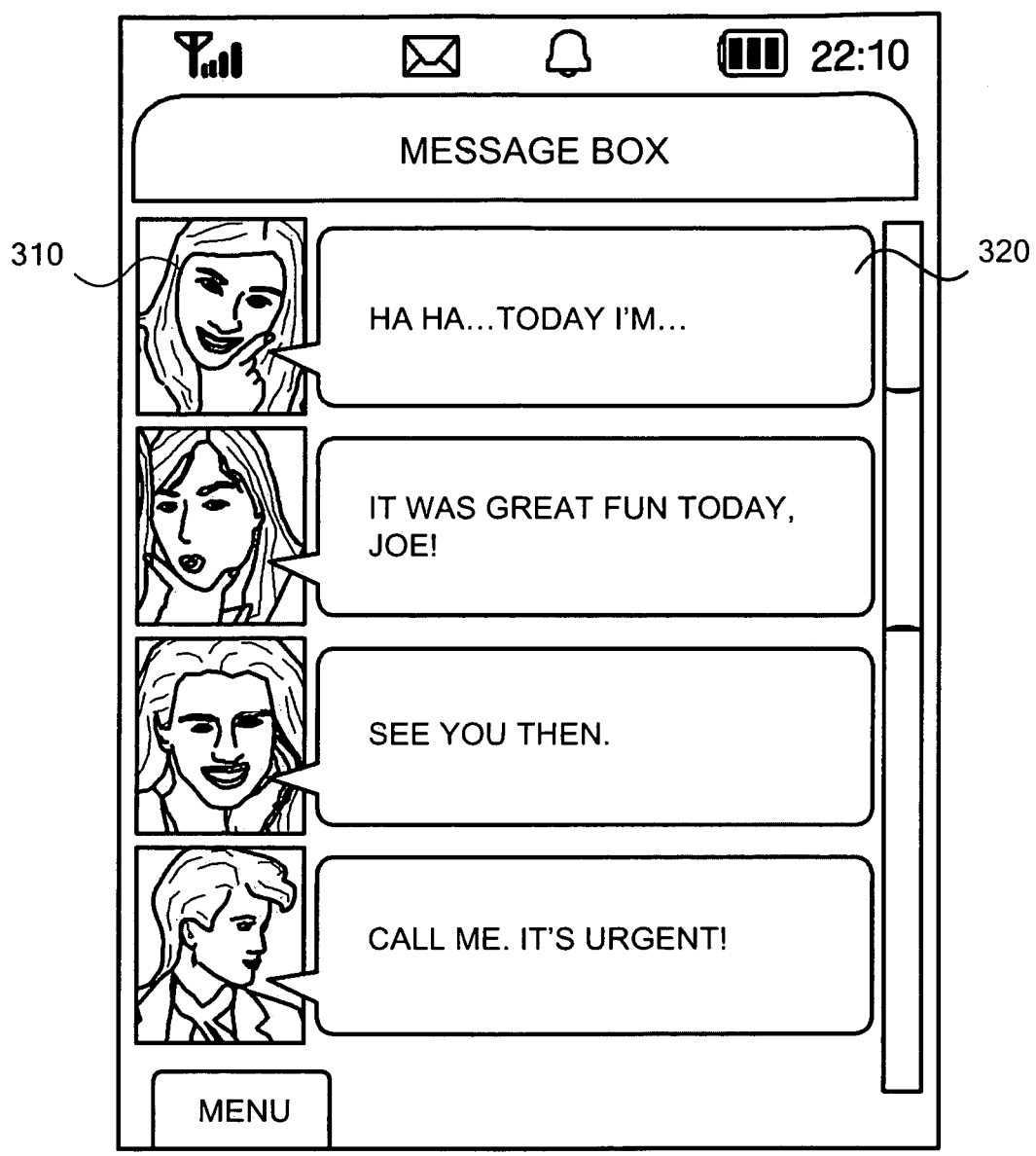

MOBILE COMMUNICATION TERMINAL AND METHOD OF THE SAME FOR OUTPUTTING SHORT MESSAGE

CROSS-REFERENCE TO RELATED APPLICATION

This application claims priority from Korean Patent Application No. 10-2005-0082862 filed on Sep. 6, 2005 in the Korean Intellectual Property Office, the entire disclosure of which is incorporated herein by reference.

BACKGROUND OF THE INVENTION

1. Field of the Invention

Apparatuses and methods consistent with the present invention relate to a mobile communication terminal and a method of the same for outputting a short message. More particularly, the present invention relates to a mobile communication terminal and a method of the same for outputting a short message, that can display information on a sender of a short message easily by enabling the mobile communication terminal to output an image of the sender together with the short message.

2. Description of the Related Art

A related art mobile communication terminal outputs a screen that is mainly composed of text information including a message, a sender, and a send time. A Multimedia Messaging Service (MMS) provided by some mobile communication terminals sends and receives messages including multimedia data, such as an image and a sound as well as text, and thus, can extend the scope of information in a mobile communication system.

Korean Patent Publication No. 2004-025313 discloses a method for editing and transmitting a picture in a mobile communication terminal. The disclosed method allows a user to select a picture by searching pictures stored in a memory, edit the picture by inputting a memo into the selected picture, and transmit the edited picture. However, the method disclosed by the Korean Patent Publication No. 2004-025313 is merely a method for transmitting the picture to the mobile communication terminal and has the problem that it is difficult for a receiver to quickly realize the identity of the sender.

SUMMARY OF THE INVENTION

The present invention provides a mobile communication terminal and a method for outputting a short message thereof, which enables a receiver to quickly realize information on a sender by outputting a received short message together with an image capable of representing the sender.

The present invention also provides a mobile communication terminal and a method for outputting a short message thereof, which can prevent related messages from being cut off by forming and continuously outputting a plurality of short messages into one group.

The present invention also provides a mobile communication terminal and a method for outputting a short message thereof, which enables a user to have an interest by displaying a short message like a cartoon using images and word balloons.

According to an aspect of the present invention, there is provided a mobile communication terminal, comprising a short message interpretation unit configured to extract a phone number of a sender from a header of a short message; a short message processing unit configured to obtain an image which is mapped to the extracted phone number and generate a screen which combines the image with a text of the short message; a phone number-image mapping unit configured to map the phone number and the image of the sender; a storage unit configured to store the phone number and the image of the sender; and an output unit configured to output the screen.

According to another aspect of the present invention, there is provided a method for outputting a short message, comprising mapping a phone number and an image of a sender of a short message; extracting the phone number of the sender from a header of the short message; obtaining an image which is mapped to the extracted phone number; generating a screen which combines the image with a text of the short message; and outputting the screen.

According to another aspect of the present invention, there is provided a method for outputting a short message, comprising mapping a first image to a phone number of a first sender, and a second image to a phone number of a second sender; extracting the phone number of the first sender from a header of a first short message; obtaining a first image from the header of the first short message; generating a first screen which combines the first image with a text of the first short message; extracting the phone number of the second sender from a header of a second short message; obtaining the second image which is mapped to the phone number of the second sender; generating a second screen which combines the second image with a text of the second short message; and outputting the first and the second screen continuously.

BRIEF DESCRIPTION OF THE DRAWINGS

The above and other features aspects of the present invention will become more apparent by describing in detail exemplary embodiments thereof with reference to the attached drawings in which:

FIG. 3 is a diagram illustrating a preview screen provided by the mobile communication terminal according to an exemplary embodiment of the present invention;

DETAILED DESCRIPTION OF EXEMPLARY EMBODIMENTS

Figure 1:
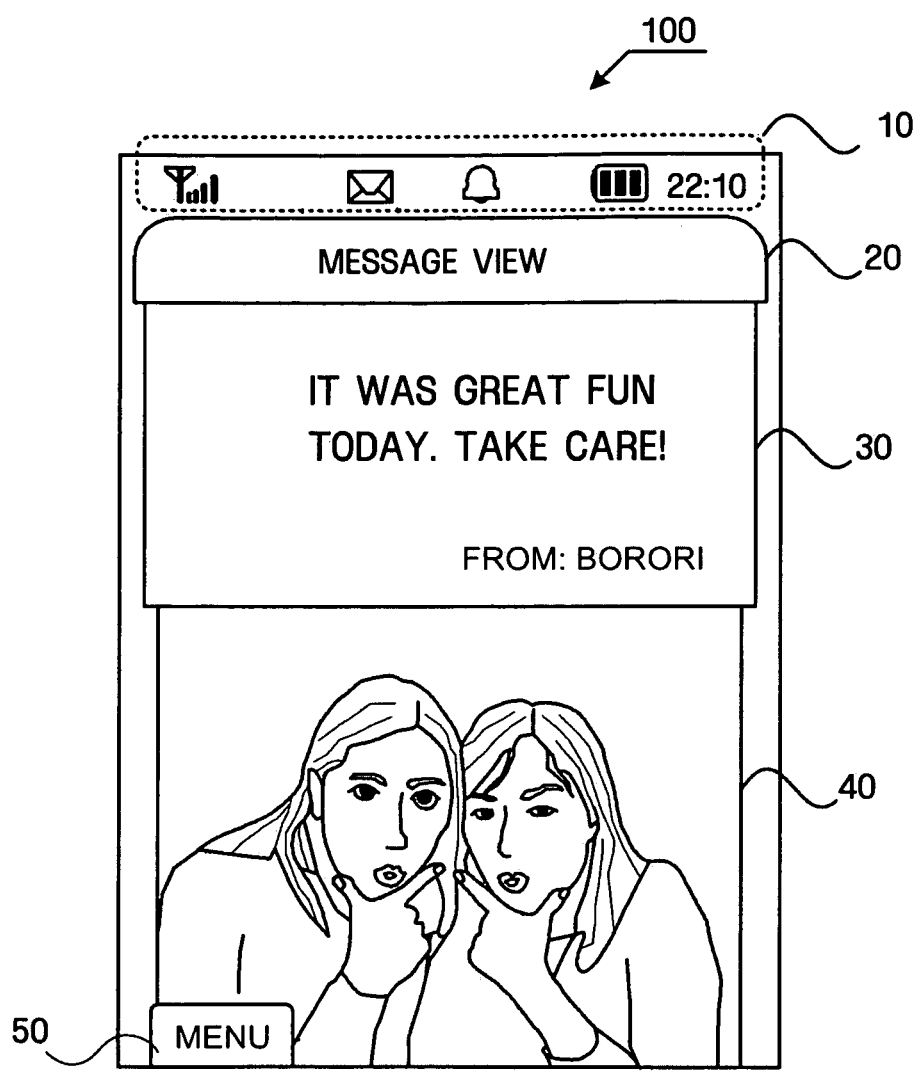
FIG. 1 is a diagram illustrating a mobile communication terminal for outputting a short message according to an exemplary embodiment of the present invention.

Subject matters and features of the exemplary embodiments of the present invention will be covered by the detailed description and drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention will be described in more detail with reference to the accompanying drawings.

It should be noted that a combination of respective blocks of accompanying block diagrams and respective steps of flow charts may be performed by computer program instructions. Since the computer program instructions may be executed in a processor of a general purpose computer, a special purpose computer or processors of other programmable data processing equipment, the instructions generate means for performing the functions explained in respective blocks of the block diagrams or in respective steps of the flow charts. Since the computer program instructions can be stored in a computer readable memory capable of directing the computer or other programmable data processing equipments so as to implement the functions in a specific mode, the instructions stored in the computer readable memory may also produce manufacturing items including instruction units for performing the functions explained in respective blocks of the block diagrams or respective steps of the flow charts. Additionally, since the computer program instructions may be also be executed in a computer or other programmable data processing equipment, the instructions for performing the series of operational steps in the computer or other programmable data processing equipment and performing the computer or other programmable data processing equipments by generating a computer executable process, may provide steps for executing the functions explained in respective blocks of the block diagrams and respective steps of the flow charts.

Further, the respective blocks or the respective steps may represent a part of a module, a segment or a code including one or more executable instructions for executing specific logic function(s). Additionally, it should be noted that functions referred in blocks or steps may be generated without regard to orders in some alternate exemplary embodiments. For example, it is possible that two blocks or steps illustrated in succession are executed concurrently or in reverse order due to relevant functions.

FIG. 1 is a diagram illustrating a mobile communication terminal for outputting a short message according to an exemplary embodiment of the present invention.

The mobile communication terminal, according to the exemplary embodiment, makes it possible for a user to quickly realize the identity of the sender of the short message by displaying the short message together with an image representing the sender, which corresponds to the sender's phone number. An exemplary embodiment of a display screen of the mobile communication terminal capable of outputting the text of the short message may include a status bar 10 for displaying icons representing a state of the mobile communication terminal, a title bar 20 for displaying a menu title, a message text area 30 for displaying the text of the short message, an image area 40 for displaying an image, a tab 50 for selecting a popup menu and the like.

The image includes all images capable of representing the identity of the sender of the short message, and may include an image of the sender, an emoticon for symbolizing the sender, and the like. The image of the sender may also be displayed with the name and/or phone number of the sender. In other words, even if several persons are displayed in the image, the user can still know the identity of the caller.

FIG. 1 illustrates an image of two people in the image area 40 and the name of the sender is displayed in the message text area 30.

Figure 2:
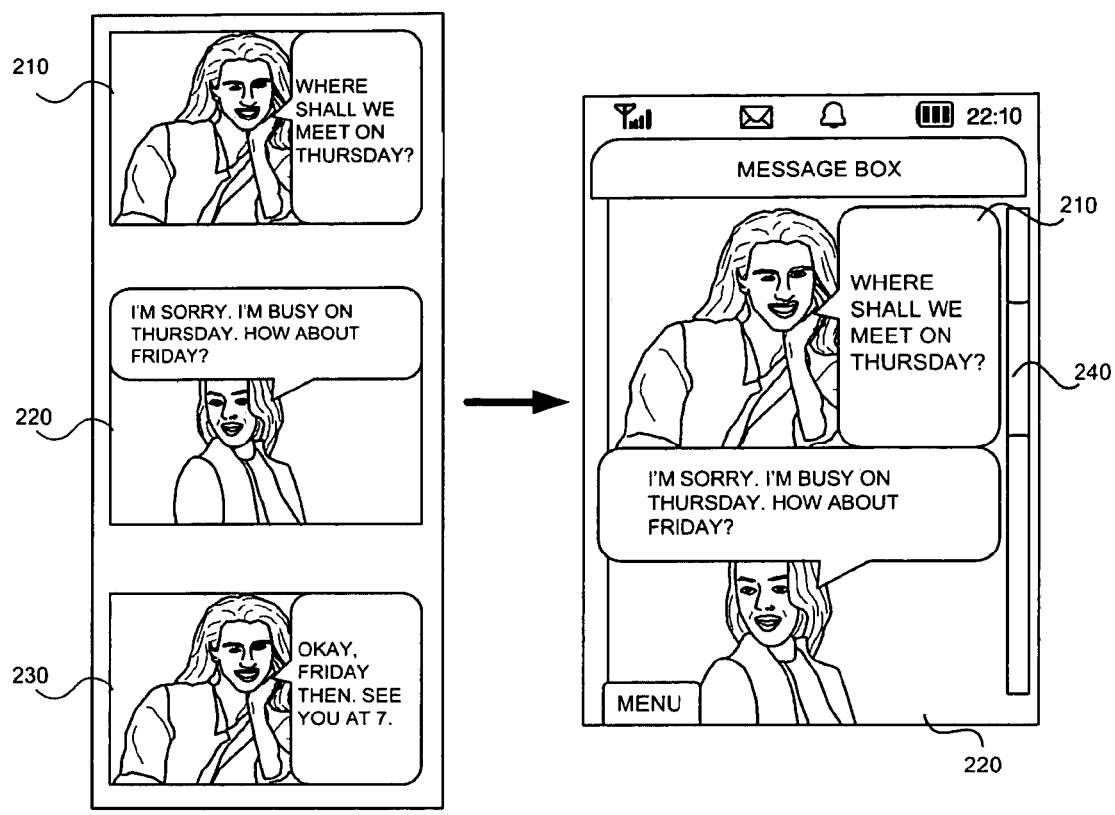
FIG. 2 is a diagram illustrating the mobile communication terminal for outputting a plurality of short messages together on one screen according to an exemplary embodiment of the present invention.

According to the exemplary embodiment, a short message display of the mobile communication terminal may display several messages on one screen using a scroll technique. FIG. 2 illustrates an exemplary embodiment where the short message viewer outputs a plurality of short messages together on one screen.

The mobile communication terminal according to the exemplary embodiment may simply display several short messages, or it may display short messages repeatedly sent to and/or received from the same person mainly using a "reply" function as one group, and display the short messages using the scroll technique. At this time, if a user of the mobile communication terminal sends a response message to a received message from another person, it is easy to group the message received from the other person and the response message as the same group. However, if a sender sends a response message corresponding to the message sent by the user of the mobile communication terminal, it is difficult to distinguish whether the received message is a response message or a new message. In this case, if a another message is received from the same sender within a predetermined time, the mobile communication terminal regards the two messages as one group. This method may be used in the mobile communication terminal according to an exemplary embodiment of the present invention.

For example, if a message 220 is transmitted as a response message after receiving a message 210 from a specific person, the message 210 and the message 220 are regarded as one group. If a message 230 is received from the same sender as the previous message 210 within a predetermined time, the message 230 is regarded as part of the group containing the message 210. Accordingly, the messages 210, 220 and 230 may be maintained as one group and continuously outputted in a message viewer of the mobile communication terminal.

Modes for continuously outputting a plurality of messages include a mode for sequentially outputting a separate screen corresponding to respective message, and a mode for sequentially outputting screens corresponding to a respective message on one screen. The user may select one of the modes.

FIG. 2 shows all screens of the messages 210, 220 and 230 connected on one screen and simultaneously outputted, and the user conveniently views related messages while scrolling the screens upward and downward using a scroll bar 240. Specifically, it is convenient for the user because it vertically connects the respective screens containing images of the sender and text within word balloons, and arraying like a comic strip. At this time, since the amount of that can be shown on one screen of the mobile communication terminal is limited, a scroll bar should be provided.

FIG. 3 is a diagram illustrating a preview screen provided by the mobile communication terminal according to an exemplary embodiment of the present invention.

The preview screen is a screen for displaying catalogs of messages before displaying the text of a short message. In general, conventional preview screens only display text, but the mobile communication terminal according to the exemplary embodiment displays catalogs of short messages with an image of the sender of the short message. The image of the sender is reduced in size and is displayed 310 as a thumbnail. An excerpt 320 of the short message is displayed beside of the image.

If one item of the preview screen is selected, the screen is converted into a message content view screen. At this time, when the selected item indicates a group having two or more messages, all messages in the group may be output by connecting them using the scroll technique, and they may be respectively output one at a time.

FIGS. 4A to 4E are diagrams illustrating an example of a screen configuration in a method for outputting a short message according to an exemplary embodiment of the present invention.

When an image of a sender of a short message is obtained, the mobile communication terminal according to the present invention integrates the corresponding image with the text of the short message, forms one screen and outputs the screen. The screen may be composed according to the content of the selected image using various methods, as described below.

As illustrated in FIGS. 4A to 4E an area for displaying the text of the short message may be a word balloon. Word balloon areas 411, 421, 431 and 441 may be located in the upper, lower part of the image, or on the right or left side of the image. The position of the word balloon is decided by analyzing the location and the direction of the face of the person in the image. The word balloon is arranged in such a manner that the face is not covered.

However, this analysis process may not be used, and the word balloon may be added so as not to cover the entire area of the image. Further, when the user of the mobile communication terminal registers the image in the phone number, the position of the text in the corresponding image may be predetermined, and the position of the text in the image may also be selected by determining whether to apply to a respective image a certain pattern of several predetermined patterns. However, according to exemplary embodiment the present invention, these methods are not limited, and it is possible to appropriately array the image and the word balloon in many ways.

Figure 4A:
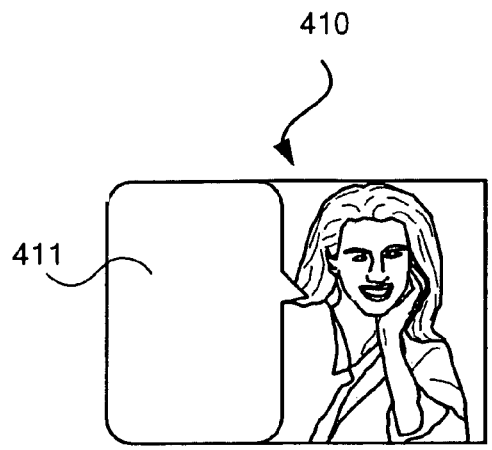
FIGS. 4A to 4E are diagrams illustrating a screen configuration according to a method for outputting a short message according to an exemplary embodiment of the present invention.

FIGS. 4A to 4E illustrate examples of arraying a word balloon differently according to the content of the image. As shown in FIG. 4A, an image 410 arrays a word balloon 411 on the left side because the person is leaning to the right. In this case, the image and the word balloon may be arrayed on one screen without reducing the size of the image.

Figure 4B:
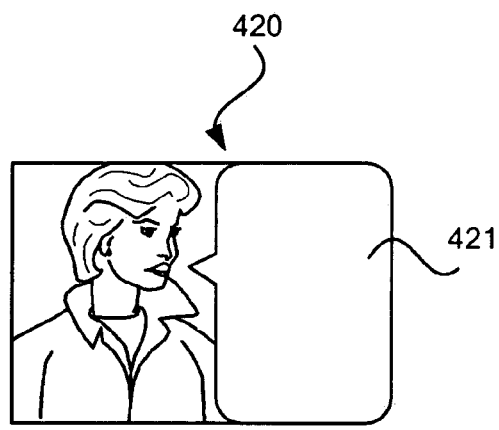
Figure 4C:
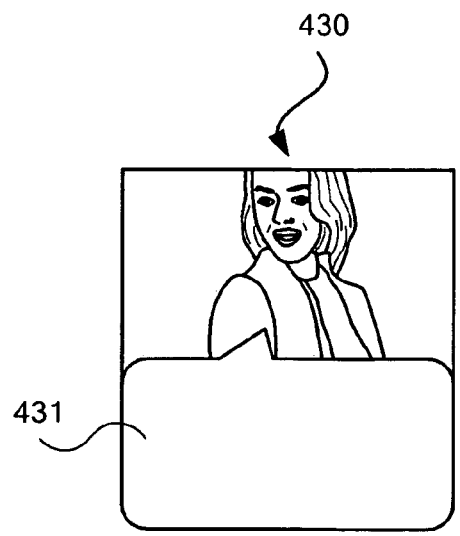
Figure 4D:
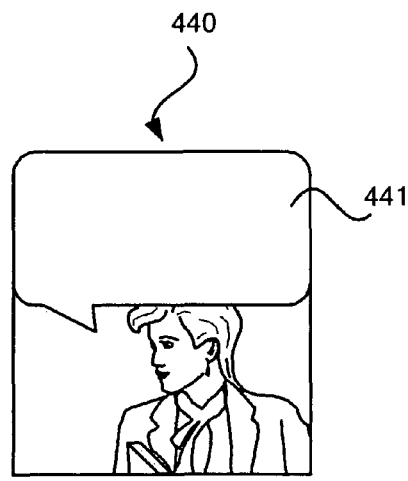

As shown in FIG. 4B, an image 420 arrays a word balloon 421 on the right because the person is leaning to the left. As shown in FIG. 4C, an image 430 arrays a word balloon 431 at the bottom of the screen because the person is upwardly disposed. As shown in FIG. 4D, an image 440 arrays a word balloon 441 upward because the person is downwardly disposed.

Figure 4E:
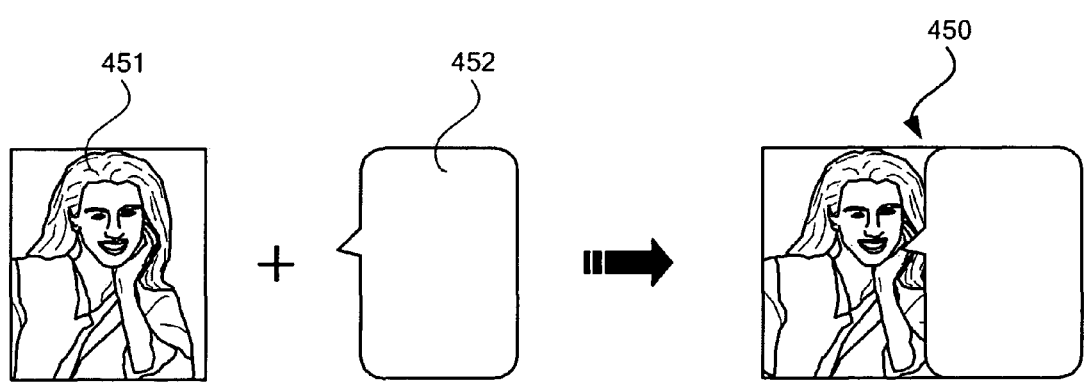

As shown in FIG. 4E, an image 450 arrays the word balloon beside the image so as not to cover the face. In this case, the size of the image may be reduced to half of the screen so as to array the image and the word balloon on one screen of the mobile communication terminal.

Figure 5:
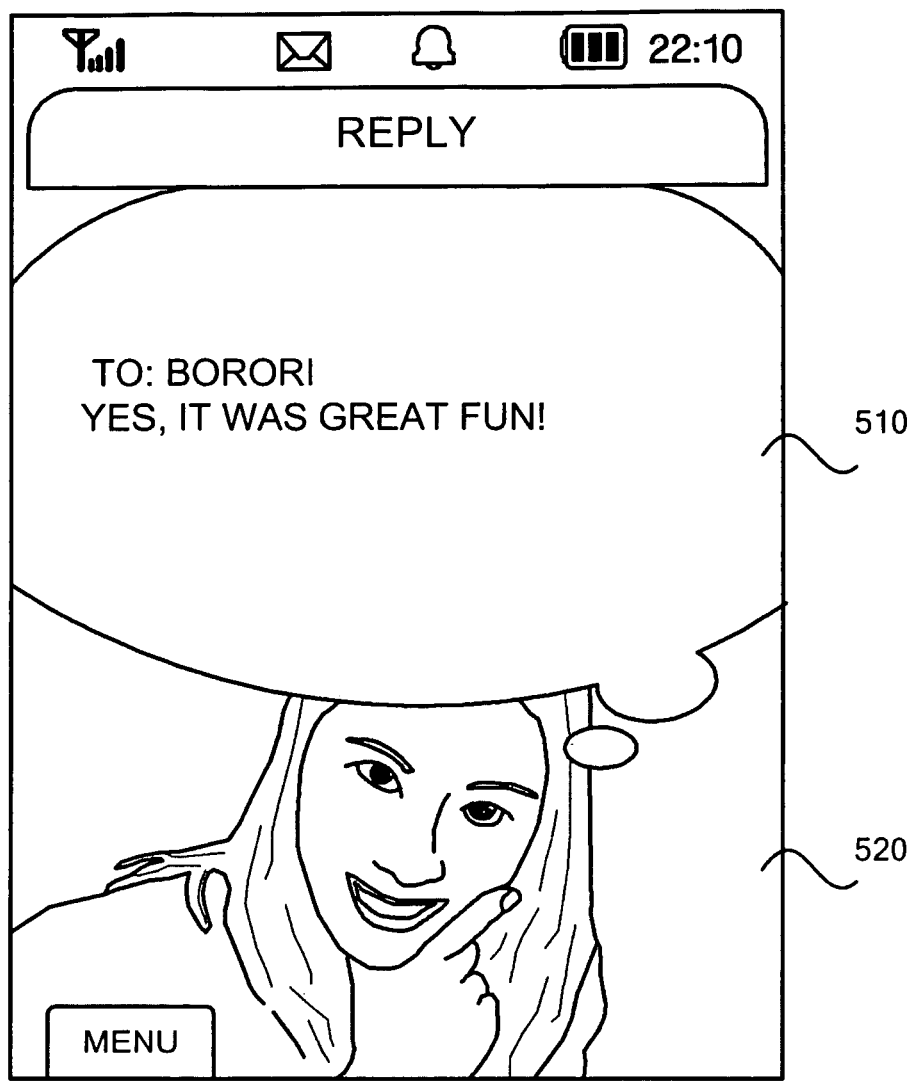
FIG. 5 is a diagram illustrating a screen which the mobile communication terminal uses to compose a short message according to an exemplary embodiment of the present invention.

FIG. 5 illustrates a screen for composing a short message in the mobile communication terminal according to an exemplary embodiment of the present invention.

Referring to FIG. 5, the short message may be directly inputted inside a word balloon by displaying an image 520 and a word balloon 510 together on a screen. The image 520 displayed at this time is a picture of a user of the mobile communication terminal. A method for finding an image of a user will be described below with reference to FIG. 7. At this time, the image is displayed only in the mobile communication terminal of the sender. This is different from the multimedia messaging service where image data is directly transmitted.

Figure 6:
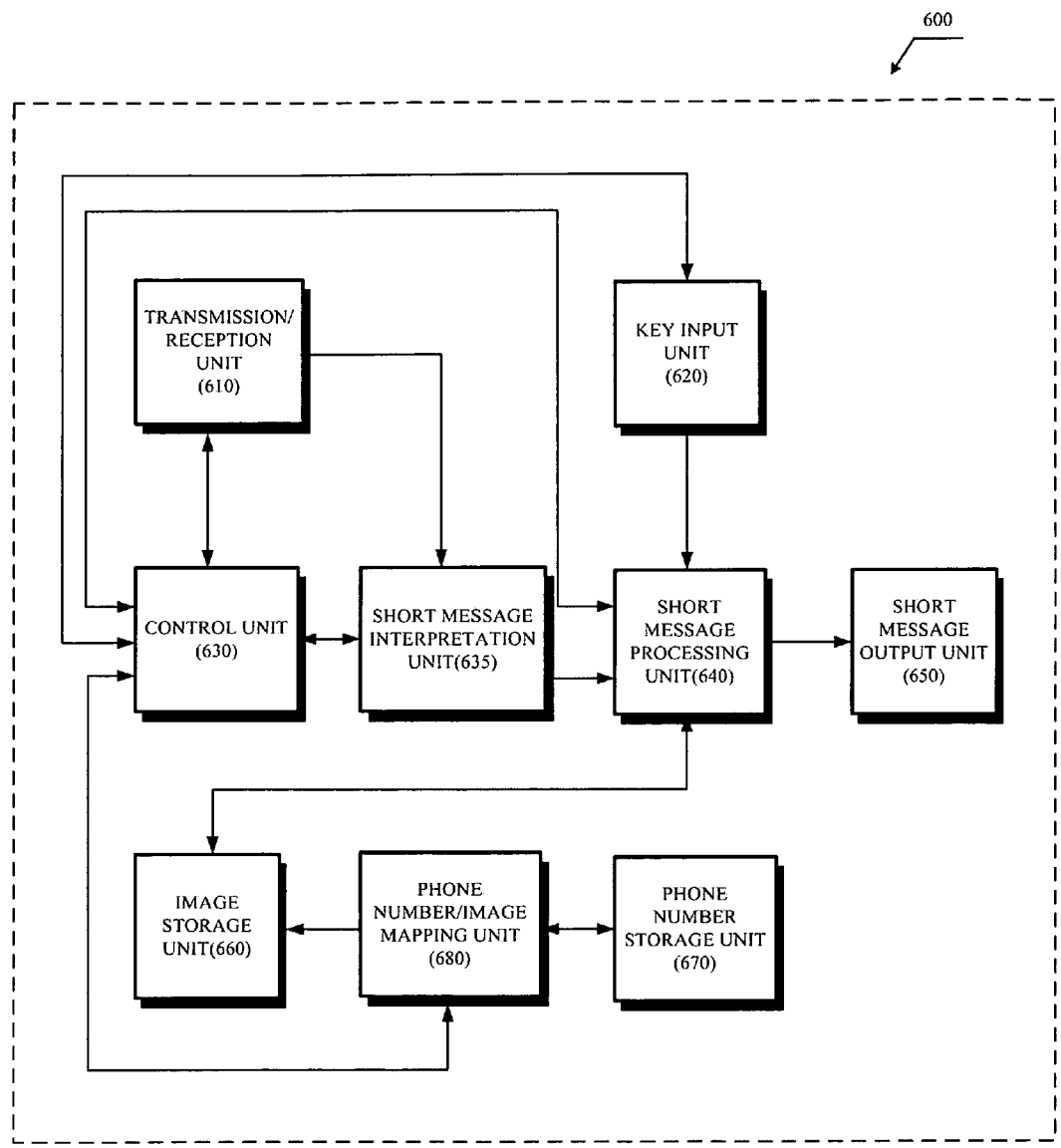
FIG. 6 is a diagram illustrating the construction of the mobile communication terminal according to an exemplary embodiment of the present invention.

FIG. 6 is a block diagram illustrating the construction of a mobile communication terminal according to an exemplary embodiment of the present invention.

The mobile communication terminal 600 according to the exemplary embodiment may include a transmitting/receiving unit 610, a key input unit 620, a control unit 630, a short message interpretation unit 635, a short message processing unit 640, a short message output unit 650, an image storage unit 670, and a phone-number/image mapping unit 680.

The phone-number/image mapping unit 680 receives a phone number to be mapped to an image, and stores the phone number as tag information of the image in the image storage unit 660 when the image is stored in the image storage unit 660.

The transmitting/receiving unit 610 receives a short message composed by a user, and transmits it.

The key input unit 620 receives a command inputted to the mobile communication terminal and the contents of the short message when a user composes the short message, and transmits them to the control unit 630 or the short message processing unit 640.

The short message interpretation unit 635 parses the short message transmitted by the transmission/receipt unit 610, and extracts information on the phone number of a sender or the received time of the short message from a header.

The short message processing unit 640 obtains, from the image storage unit 660, the image, which is mapped to the phone number, using the phone number of the sender transmitted by the short message interpretation unit 635, generates a screen on which the image of the sender is combined with the text of the short message, and transmits the screen to the short message output unit 650. Meanwhile, the short message processing unit 640 groups two or more short messages, and controls the messages as a group. The short message processing unit 640 outputs the screens on which the images of a plurality of short messages are combined with text.

Further, the short message processing unit 640 generates a preview screen of the short message and transmits the preview screen to the short message output unit 650. The preview screen, as described in detail in FIG. 3, may be generated by combining a thumbnail image of the sender with an excerpt of the short message.

The short message output unit 650 receives and outputs a text screen of the short message, a scroll screen with which combines the text screens of a plurality of short messages, a preview screen of the short message and the like from the short message processing unit 640.

FIG. 6 illustrates that the image storage unit 660 is separated from the phone number storage unit 670. However, it should be apparent to those skilled in the art that the storage units 660 and 670 may be implemented separately or integrated into one storage unit.

The control unit 630 functionally connects the transmitting/receiving unit 610, the key input unit 620, the short message interpretation unit 635, the short message processing unit 640, and the phone-number/image mapping unit 680, and controls the operation of each respective unit.

Respective elements shown in FIG. 6 may be embodied as software or hardware such as a field programmable gate array (FPGA) and an application-specific integrated circuit (ASIC). The elements may be constituted so as to be included in an addressable storage media, or to execute one or more processors. A function provided by the elements may be implemented by segmenting the elements, or by integrating a plurality of elements and performing a specific function. Moreover, the elements may be implemented so as to execute one or more computers in a system.

Figure 7:
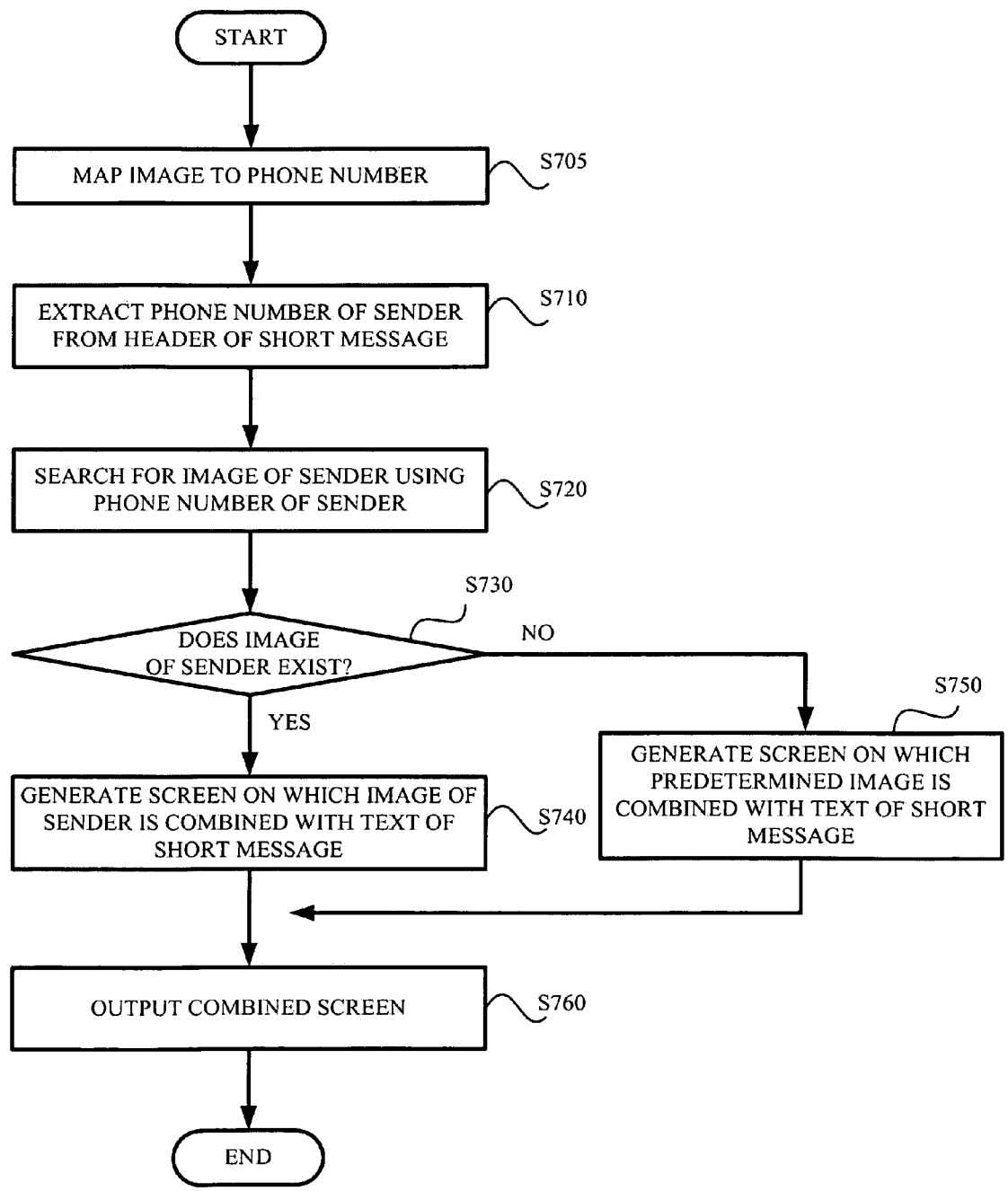
FIG. 7 is a flow chart illustrating a process of showing the text of a short message in the method for outputting the short message according to an exemplary embodiment of the present invention.

FIG. 7 is a flow chart illustrating a process of displaying the text of a short message in the short message outputting method according to an exemplary embodiment of the present invention.

The mobile communication terminal 600 according to the exemplary embodiment performs an operation of mapping an image in the terminal to a phone number (S705). This mapping may be achieved by receiving the phone number to be mapped from the user when the image is stored. The mobile communication terminal performs parsing on the short message received from another mobile communication terminal or composed by the user, and extracts the phone number of the sender from a header (S710). The mobile communication terminal searches for an image of the sender mapped to the phone number of the sender (S720). In the case where several images are combined, an image may be arbitrarily selected or an image suitable for the contents of the text of the message may be selected. For example, when a smiling image, a crying image, an angry image of a specific sender or the like are registered, the smiling image may be selected in the case where the text of the message is positive, and the crying image may be selected in the case where the text of the message is negative. Meanwhile, in the case where no image data is registered with the phone number of the sender, a predetermined default image may be used.

At this time, the image of the sender may be stored inside the mobile communication terminal or in a separate external storage.

It is determined whether an image of the sender exists (S730), and if an image exists, a screen that combines the image of the sender with the text of the short message is generated (S740), and output to a display, such as an liquid crystal display (LCD), of the mobile communication terminal (S760). On the other hand, if no image exists, a screen that combines the default image with the text of the short message is generated (S750), and output to the display of the mobile communication terminal (S760).

Figure 8:
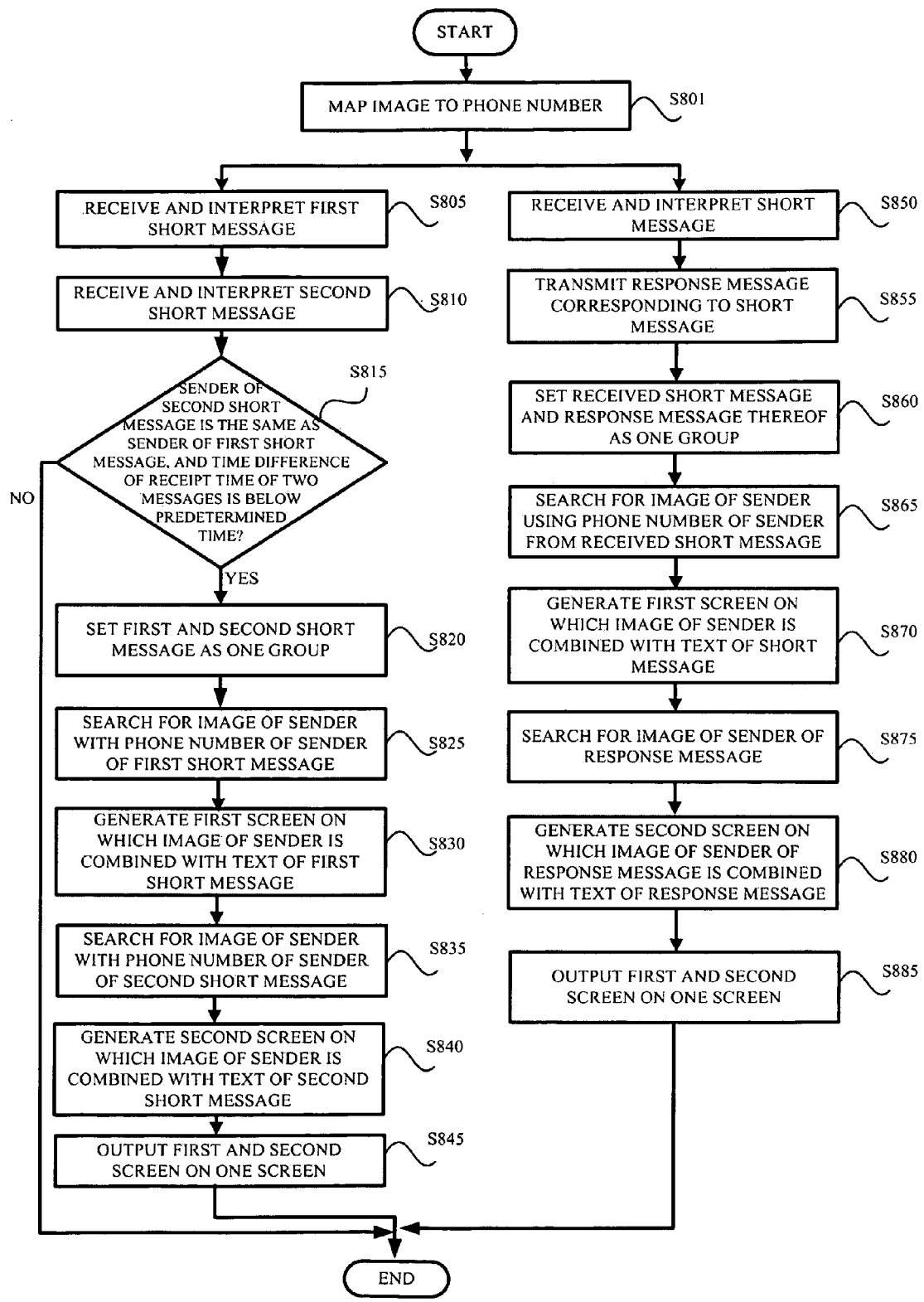
FIG. 8 is a flow chart illustrating a process of outputting the text of two or more short messages on one screen in the method for outputting the short message according to an exemplary embodiment of the present invention.

FIG. 8 is a flow chart illustrating a process of outputting the text of two or more short messages on one screen in the short message outputting method according to an exemplary embodiment of the present invention.

The mobile communication terminal 600 according to the exemplary embodiment performs an operation for mapping an image in the terminal to the stored phone number (S801). The mobile communication terminal 600 receives and interprets first and second short messages (S805) and (S810). It is determined whether the second short message was transmitted by the same sender as that of the first short message, and whether it was received within a predetermined time (relative to the time that the first short message was received) (S815). If "YES", the second short message is grouped with the first short message as one group (S820). Since the first and the second short message are grouped, the two messages may be simultaneously displayed according to a user's selection. The mobile communication terminal searches for an image of the sender using the phone number of the sender of the first short message (S825), and generates a first screen on which the image of the sender is combined with the text of the first short message (S830). Further, the mobile communication terminal searches for the image of the sender using the phone number of the sender of the second short message (S835), and generates a second screen on which the image of the sender is combined with the text of the second short message (S840). The mobile communication terminal simultaneously outputs the first and second screens as one screen (S845).

Meanwhile, if the user receives and interprets a short message, and transmits a response message, the received message and the response message are related in content, and thus may be output on one screen by grouping the messages into one group. For this purpose, the mobile communication terminal receives the short message (S850). Then, the user transmits the response message corresponding to the received short message (S855), and the received short message and the response message are set as one group (S860). The mobile communication terminal searches for the image of the sender using the phone number of the sender of the received message (S865), and generates a first screen on which the image of the sender is combined with the text of the received short message (S870). Further, the mobile communication terminal searches for the image of the sender of the response message (S875), and generates a second screen on which the image of the sender of the response message is combined with the text of the response message (S880). Additionally, the mobile communication terminal outputs the first and second screens as one screen (S885).

Figure 9:
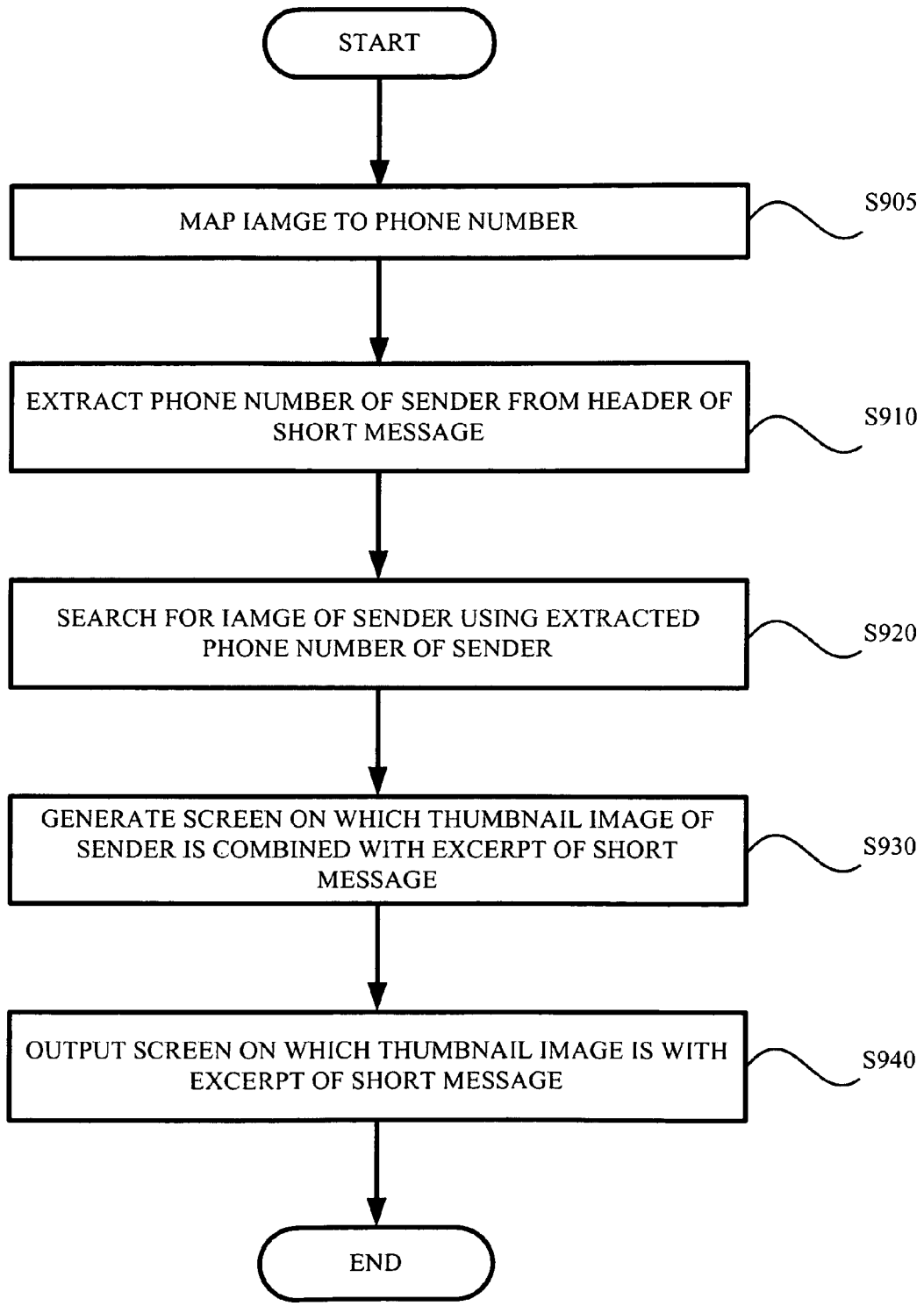
FIG. 9 is a flow chart illustrating a process of outputting a preview screen of the short message in the method for outputting the short message according to an exemplary embodiment of the present invention.

FIG. 9 is a flow chart illustrating a process of outputting a preview screen of the short message in the short message outputting method according to an exemplary embodiment of the present invention.

The mobile communication terminal performs an operation for mapping the phone number to an image stored in the terminal (S905). The mobile communication terminal extracts the phone number of the sender from the header of the short message (S910), and searches for the image of the sender using the phone number of the sender (S920). The mobile communication terminal generates a preview screen by attaching an excerpt of the short message to the thumbnail image of the sender (S930), and outputs the preview screen on the display such as the LCD of the mobile communication terminal (S940).

The mobile communication terminal and the method for outputting the short message thereof according to the present invention may produce the following effects.

First, the receiver may quickly realize information on the sender by outputting the received short message together with the image of the sender.

Second, the present invention may prevent related messages from being cut off by forming a plurality of short messages into one group, and outputting the messages on one screen.

Third, the present invention may create a visually appealing and user-friendly interface.

It should be understood by those of ordinary skill in the art that various replacements, modifications and changes in the form and details may be made therein without departing from the spirit and scope of the present invention as defined by the following claims. Therefore, it is to be appreciated that the above described exemplary embodiments are for purposes of illustration only and are not to be construed as limitations of the invention.

What is claimed is:

1. A mobile communication terminal comprising:
a receipt unit which receives a short message based on a Short Message Service, wherein the short message is transmitted by a first sender;
a short message interpretation unit which extracts a phone number of the first sender of the short message from a header of the short message;
a mapping unit which maps the phone number and an image of the first sender;
a short message processing unit which generates a first screen on which the image of the first sender is combined with the received short message if the image of the first sender mapped to the phone number exists; and
an output unit which outputs the first screen to be displayed,
wherein the first screen includes a word balloon in which the short message is displayed, and
wherein the short message processing unit generates a second screen including an image of a second sender combined with a short message of the second sender and setts at least the first screen and the second screen in a group,
wherein the output unit outputs at least the first screen and the second screen at the same time, and
wherein the first screen includes a thumbnail image corresponding to the phone number of the first sender and an excerpt of the received short message.

2. The mobile communication terminal of claim 1, wherein the image is a picture of the first sender.

3. The mobile communication terminal of claim 1, wherein the short message processing unit analyzes a position and a direction of a face in the image of the first sender and arrays the received short message in a position so as not to cover the face.

4. The mobile communication terminal of claim 1, wherein a position of the received short message is as a specific area of the image of the first sender.

5. The mobile communication terminal of claim 1, wherein the output unit outputs a combined screen corresponding to at least two short messages set as the group.

6. The mobile communication terminal of claim 1, wherein the output unit connects a combined screen corresponding to at least two short messages set as the group and outputs the combined screen.

7. The mobile communication terminal of claim 1, wherein the short message processing unit sets a first short message and a second short message as a group if a sender of the first short message is the same as a sender of the second short message, and a time difference between a time that the first short message is received and a time that the second short message is received is less than a predetermined time.

8. The mobile communication terminal of claim 7, wherein the output unit continuously outputs a screen corresponding to the first short message and a screen corresponding to the second short message, each of which is set as the group.

9. The mobile communication terminal of claim 7, wherein the output unit connects the screen corresponding to the first short message and the screen corresponding to the second short message, each of which is set as the group, and simultaneously outputs the screens.

10. The mobile communication terminal of claim 1, wherein the short message processing unit sets a first short message and a second short message as a group if the second short message is a response message corresponding to the first short message.

11. The mobile communication terminal of claim 10, wherein the output unit continuously outputs a screen corresponding to the first short message and a screen corresponding to the second short message, each of which is set as the group.

12. The mobile communication terminal of claim 10, wherein the output unit connects the screen corresponding to the first short message and the screen corresponding to the second short message, each of which is set as the group, and simultaneously outputs the screens.

13. A method for outputting a short message on a mobile communication terminal, the method comprising:
receiving the short message based on a Short Message Service, wherein the short message is transmitted by a first sender;
mapping a phone number of the first sender of the short message and an image of the first sender;
extracting the phone number of the first sender from a header of the short message;
generating a screen on which the image of the first sender is combined with the received short message if the image of the first sender mapped to the phone number exists; and
outputting the screen to be displayed,
wherein the generating the screen comprises generating a first screen which includes the image and a word balloon in which the received short message is displayed, and
wherein the generating the screen comprises generating a second screen including an image of a second sender combined with a short message of the second sender and setting at least the first screen and the second screen in a group,
wherein the outputting the screen comprises outputting at least the first screen and the second screen at the same time, and
wherein the first screen includes a thumbnail image corresponding to the phone number of the first sender and an excerpt of the received short message.

14. The method of claim 13, wherein the image of the first sender is a picture of the first sender.

15. The method of claim 13, wherein the generating the screen comprises analyzing a position and a direction of a face in the image of the first sender and arraying the received short message in a position so as not to cover the face.

16. The method of claim 13, wherein a position of the received short message is a specific area of the image of the first sender.

17. The method of claim 13, wherein the generating the screen comprises generating the screen by combining a thumbnail image with an excerpt of the received short message.

18. A method for outputting short messages on a mobile communication terminal, the method comprising:
receiving a first short message and a second short message based on a Short Message Service, wherein the first short message and the second short message are transmitted by a first sender and a second sender, respectively;
mapping a first image to a phone number of the first sender of the first short message, and a second image to a phone number of the second sender of the second short message;
extracting the phone number of the first sender from a header of the first short message;
obtaining the first image that is mapped to the phone number of the first sender;
generating a first screen on which the first image is combined with the received first short message;

extracting the phone number of the second sender from a header of the received second short message;
obtaining the second image that is mapped to the phone number of the second sender;
generating a second screen on which the second image is combined with the received second short message; and
outputting the first and second screens to be displayed at the same time,
wherein the first screen includes the first image and a word balloon in which the first short message is displayed,
wherein at least the first screen and the second screen are set in a group, and
wherein the first screen includes a thumbnail image corresponding to the phone number of the first sender and an excerpt of the received short message.

19. The method of claim 18, wherein the outputting the first and second screens comprises connecting the first and second screens and simultaneously outputting the screens.

20. The method of claim 18, wherein the first sender is the same as the second sender, and a time difference between reception of the first short message and reception of the second short message is less than a predetermined time.

21. The method of claim 18, wherein the second short message IS a response message corresponding to the first short message.

22. The method of claim 18, wherein the first image is a picture of the first sender.

23. The method of claim 18, wherein the generating the first screen comprises analyzing a position and a direction of a face in the first image and arraying the first short message in a position so as not to cover the face.

24. The method of claim 18, wherein a position of the first short message is as a specific area of the first image.

25. A non-transitory recording medium configured to record a computer readable program that is executable by a computer for performing a method for outputting a short message on a mobile communication terminal, the method comprising:
receiving the short message on a Short Message Service, wherein the short message is transmitted by a first sender;
mapping a phone number of the first sender of the short message and an image of the first sender;
extracting the phone number of the first sender from a header of the short message;
generating a screen on which the image of the first sender is combined with the received short message if the image of the sender mapped to the phone number exists; and
outputting the screen to be displayed,
wherein the generating the screen comprises generating a first screen which includes the image and a word balloon in which the received short message is displayed,
wherein the generating the screen comprises generating a second screen having an image of a second sender combined with a short message of the second sender and setting at least the first screen and the second screen in a group, and the outputting the screen comprises outputting at least the first screen and the second screen at the same time, and
wherein the first screen includes a thumbnail image corresponding to the phone number of the first sender and an excerpt of the received short message.

26. A non-transitory recording medium configured to record a computer readable program that is executable by a computer for performing a method for outputting short messages on mobile communication terminals, the method comprising:
receiving a first short message and a second short message based on a Short Message Service, wherein the first short message and the second short message are transmitted by a first sender and a second sender, respectively;
mapping a first image to a phone number of the first sender of the first short message, and a second image to a phone number of the second sender of the second short message;
extracting the phone number of the first sender from a header of the first short message;
obtaining the first image that is mapped to the phone number of the first sender;
generating a first screen on which the first image is combined with the received first short message;
extracting the phone number of the second sender from a header of the received second short message;
obtaining the second image that is mapped to the phone number of the second sender;
generating a second screen on which the second image is combined with the received second short message; and
outputting the first and second screens continuously to be displayed at the same time,
wherein the first screen includes the first image and a word balloon in which the first short message is displayed,
wherein at least the first screen and the second screen are set in a group, and
wherein the first screen includes a thumbnail image corresponding to the phone number of the first sender and an excerpt of the received short message.

* * * * *